Patented Oct. 15, 1929

1,731,400

UNITED STATES PATENT OFFICE

JOKICHI TAKAMINE, JR., OF CLIFTON, NEW JERSEY, ASSIGNOR TO TAKAMINE FERMENT COMPANY, OF NEW YORK, N. Y., A CORPORATION OF WEST VIRGINIA

DIASTATIC COMPOSITION AND PROCESS OF MAKING THE SAME

No Drawing.    Application filed August 20, 1918.   Serial No. 250,627.

The object of this invention is to provide a diastatic composition suitable for a great many purposes, such for example as a yeast aid of high value in food.

A further object of the invention is to provide a composition of the character referred to which enables the baking of bread without the use of malt extract, sugar, and with less yeast.

Further objects of the invention will appear more fully hereinafter.

The invention consists substantially in the process to be hereinafter set forth and the product derived thereby.

It is among the special purposes of my present invention to provide a diastatic composition obtained by carrying out a particular process, and while I will now describe the particular process and the properties of the composition thus obtained I wish it to be understood that my invention is not to be limited or restricted to the specific illustrations about to be given as very many changes in the steps may be made and accomplish the same results, and I therefore desire to have the following description of the process of my invention regarded in an illustrative sense and not in a limiting sense. Further, as one specific use for the product of my invention, I will describe the same as employed in connection with the making of leavened bread, but I do not desire to have my invention limited or restricted to this specific use as many other valuable uses thereof may be had.

This invention utilizes the known starch dissolving diastatic extracts for the basic material. Such an extract is disclosed in and obtained by the process of Patent No. 1,391,219, patented September 20, 1921, on application Serial No. 213,431, filed January 23, 1918, as its basic material. According to the disclosure of this patent the now well known suitable culture medium is prepared of bran and the like upon which the seed spores of the selected fungi are planted. Propagation is then carried out by suitable methods of agitation or of still growth. Thereafter, under proper conditions, the diastatic extract is obtained, usually by lixiviating with water. The extract may then be further concentrated and rendered antiseptic.

In accordance with my invention I mix a starch dissolving diastatic extract, such as is obtained by the process outlined above, with an alakli, such as sodium bicarbonate, to neutralize the said extract. With the solution thus obtained I mix a suitable salt, such as magnesium chlorid or calcium chlorid, to thus form a precipitate which is obtained by filtration. This precipitate contains compounds of unknown molecular structure, but is found to be composed of various organic phosphate compounds, which I have found to have a great stimulating effect on the growth of yeast and to have great diastatic properties. The precipitate thus obtained may be used in various combinations, but where the same is to be used as a substitute for yeast, that is, as an yeast aid to reduce the quantity required, I have found the following quantities to be satisfactory—precipitate 3 lbs., corn starch 40 lbs., sodium phosphate 2 lbs., dextrose or invert sugar 60 lbs. The mass obtained in the foregoing quantities is then pulverized producing the composition product of my invention in the form of a yellow powder, partially soluble in water and sweet to the taste, having as above set forth, great diastatic properties and a stimulating effect on the growth of yeast. This composition of my invention is particularly useful in the baking of leavened bread either in the sponge process or with the straight dough process. Inasmuch as I have found that in the filtrate there is considerable sugar it is also possible to obtain the product of my invention by using both the filtrate and the precipitate by mixing the two with corn starch, which, in this example acts as the body and the mass thus secured is then dried and powdered as above described. In the baking of bread a single batch of bread normally requires the use of 149 pounds of say wheat flour, three pounds of sugar, from three to three and one-half pounds of yeast, and three pounds of malt extract, including, of course, the twenty-five per cent, or approximately forty-seven pounds of cereal as broken grains of corn, wheat, oats, barley and the like, to be used with the flour, as required by law where conservation of flour is necessary. In the sponge process, it is customary to make a preliminary mixture consisting of about one-half of the flour, somewhat more than one-half of the water, and usually all of the yeast. These ingredients are thoroughly mixed, by suitable machinery, and the resulting mixture is then withdrawn from the mixing vessel and allowed to ferment for a suitable period of time in a baker's trough. Towards the end of the sponge fermentation, it "falls," and is then permitted to rise again. In this condition, it is transferred into the dough-mixer, wherein it receives the addition of the remainder of the flour and other constituents which are to enter into the composition of the final dough, as for instance, the usual amounts of sugar, salt, shortening, milk and the like. The ingredients in the dough-mixer are thereupon thoroughly incorporated with each other, under suitable conditions of temperature. The resulting dough is thereafter allowed to ferment further in the usual manner, divided into loaves, compacted, permitted to rise, molded for the pans, etc., incident to the art of baking bread, which is well known and requires no further amplification. In the straight dough process all ingredients are usually incorporated with each other at the beginning of the operation. With certain well known differences in the manipulation of the dough during the fermenting period, the straight dough process proceeds along the same general lines as the sponge process. The foregoing table of ingredients with their approximate quantities employed in connection with one batch are, of course, not all of the ingredients of the bread, but by comparison with same and with the table below setting forth the amounts of the same ingredients required when the product of my invention is employed the advantages and the merit of the product of my invention will be obvious. When employing the product of my invention the following quantities are recommended—flour 147 pounds; no sugar; yeast, one and one-half to one and three-quarter pounds; no malt extract, and, of course, twenty-five per cent of the selected cereal if necessary to conserve the flour required. From the foregoing it will be seen that by employing the product of my invention in the baking of bread it is possible in obtaining the same quantity of bread to employ less flour, eliminate the requirement of sugar and malt extract, and to cut the amount of yeast required into approximately one-half of the amount normally used. The economy in the baking of bread with bread of the same quality as a product renders the product of my invention valuable as a yeast aid as will be apparent.

Having now set forth the objects and nature of my invention, what I claim as new and useful and desire to secure by Letters Patent is:—

1. The process of preparing an organic composition having diastatic properties which consists in neutralizing a diastase containing mixture in solution and precipitating said composition therefrom by means of magnesium chlorid.

2. The process of preparing an organic product having a stimulating effect on yeast growth which consists in neutralizing a diastatic extract, and precipitating said product therefrom by means of a chloride of a metal of group two of the periodic system.

3. The process of preparing an organic product having a stimulating effect on yeast growth which consists in neutralizing a diastatic extract, and precipitating the product therefrom by means of magnesium chloride.

4. The process of preparing a product possessing diastatic properties which consists in adding sodium bicarbonate to a diastatic solution and precipitating the product therefrom by means of magnesium chlorid.

5. The process of preparing a product possessing diastatic properties which consists in adding sodium bicarbonate to a diastatic solution and precipitating the product therefrom by means of a chloride of a metal of group two of the periodic system.

In testimony whereof I have hereunto set my hand on this 9th day of August A. D. 1918.

JOKICHI TAKAMINE, Jr.